Figure 1:
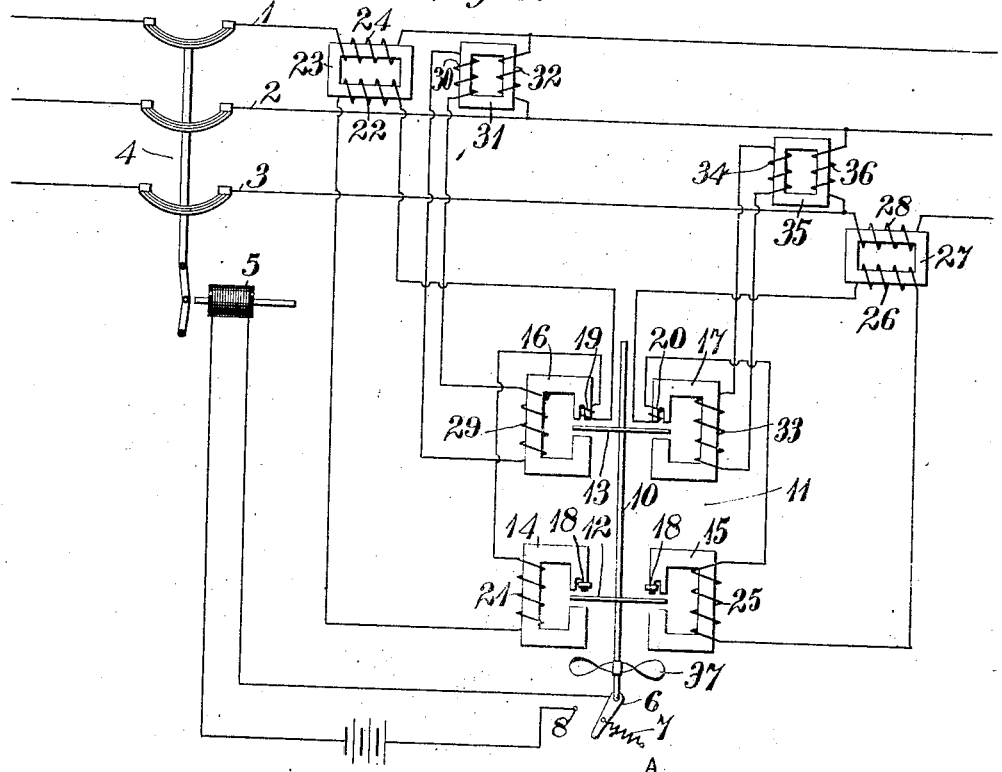

F. CONRAD.
OVERLOAD AND REVERSE CURRENT RELAY DEVICE.
APPLICATION FILED MAY 8, 1905.

933,746.

Patented Sept. 14, 1909.
3 SHEETS—SHEET 1.

WITNESSES:
Fred H. Miller
Otto S. Schairer

INVENTOR
Frank Conrad
BY
ATTORNEY

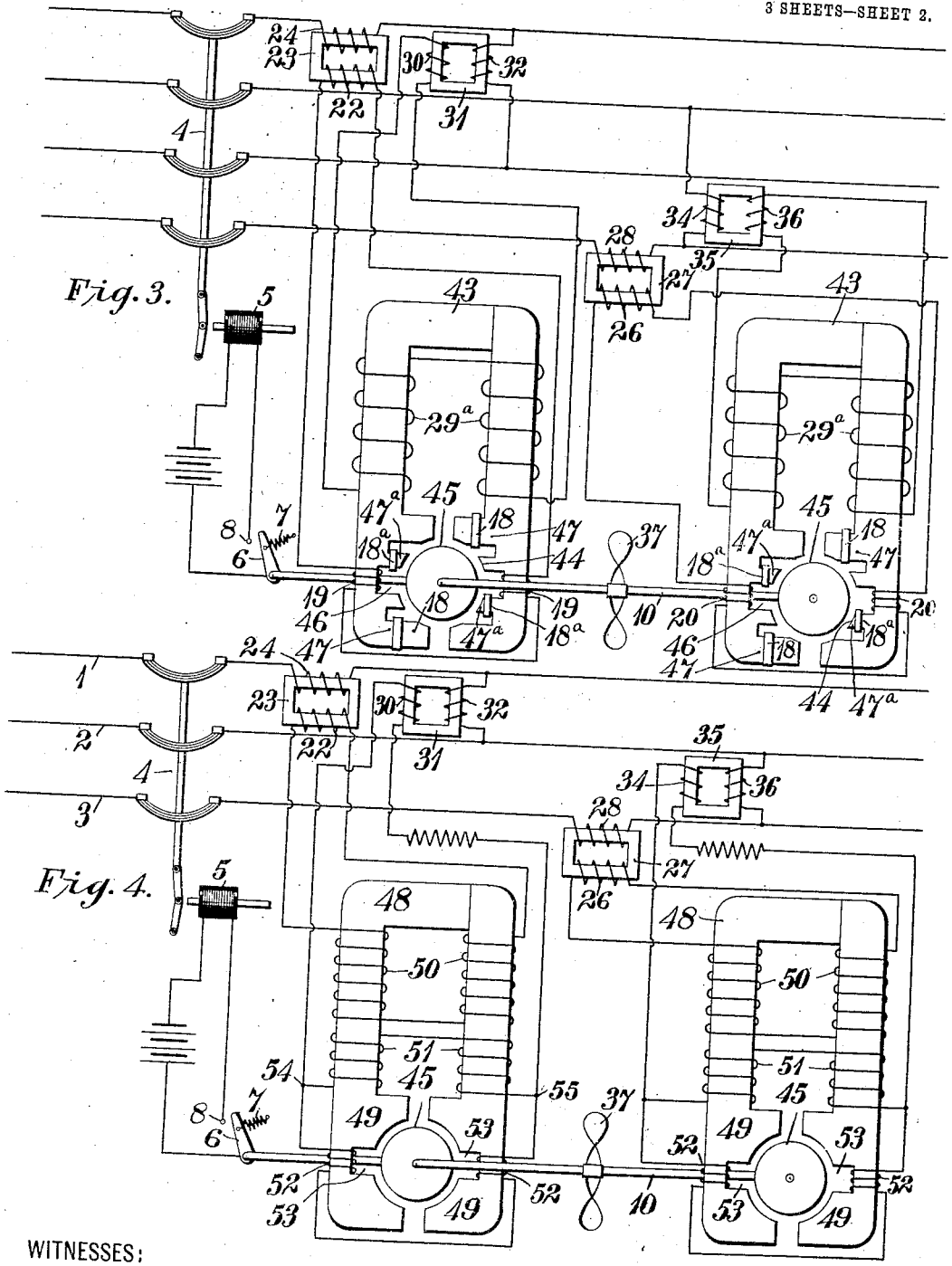

F. CONRAD.
OVERLOAD AND REVERSE CURRENT RELAY DEVICE.
APPLICATION FILED MAY 8, 1905.

933,746.

Patented Sept. 14, 1909.
3 SHEETS—SHEET 3.

WITNESSES:
Fred H. Miller
Otto S. Schairer

INVENTOR
Frank Conrad
BY
Wesley G. Carr
ATTORNEY

UNITED STATES PATENT OFFICE.

FRANK CONRAD, OF EDGEWOOD PARK, PENNSYLVANIA, ASSIGNOR TO WESTINGHOUSE ELECTRIC & MANUFACTURING COMPANY, A CORPORATION OF PENNSYLVANIA.

OVERLOAD AND REVERSE CURRENT RELAY DEVICE.

933,746.

Specification of Letters Patent. Patented Sept. 14, 1909.

Application filed May 8, 1905. Serial No. 259,388.

*To all whom it may concern:*

Be it known that I, FRANK CONRAD, a citizen of the United States, and a resident of Edgewood Park, in the county of Allegheny and State of Pennsylvania, have invented a new and useful Improvement in Overload and Reverse Current Relay Devices, of which the following is a specification.

My invention relates to protective means for electric circuits, and particularly to relay devices that control the operation of circuit-protective apparatus.

The object of my invention is to provide a relay device which shall insure operation of the circuit-protective apparatus when the direction of the drop of potential in the circuit becomes reversed, or when the current traversing the circuit exceeds a predetermined amount, regardless of the voltage or power factor of the circuit.

Relay devices of the general character indicated above have usually embodied means for producing a force or torque approximately proportional to the product of the current, voltage and power factor of the circuit it was intended to protect. Such devices have operated imperfectly, because when an undue amount of current traverses a circuit, the voltage and power factor of the circuit may drop considerably and consequently sufficient torque may not be exerted to operate the instrument and trip the circuit-breakers when it is most necessary that the circuit-breakers be opened. Means have sometimes been embodied in such devices for increasing the torque in proportion to decrease in voltage, but the devices have usually been very complex in structure, and, so far as I am aware, no relay device has heretofore been constructed that was operative regardless of changes both in voltage and in power factor.

Besides the usual wattmeter device for producing a torque, my invention embodies a torque-producing means that is responsive to the amount of current traversing the circuit, the two torques being normally opposed. If the current traversing the circuit exceeds a predetermined amount, the torque that is dependent upon the current alone may exceed that which is dependent upon the product of current, voltage and power factor (which, as before explained, may be small on account of the decrease in voltage and power factor) by such an amount as to effect operation of the device and cause the circuit-breaker to open. If, for any reason, the current reverses its direction; that is, if the direction of the drop of potential in the circuit becomes reversed, the two torques act in the same direction, and if the total torque exceeds a predetermined amount, the device will operate and cause the circuit-breaker to open.

Figure 2:
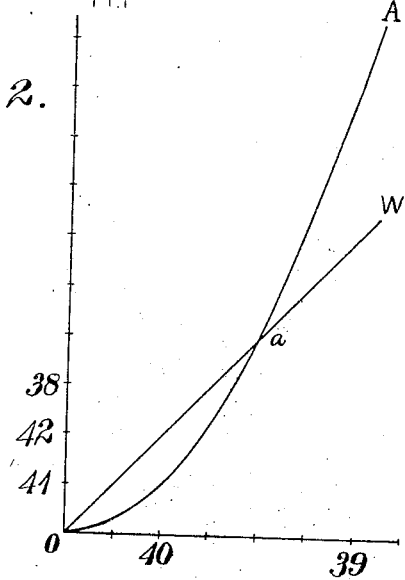
Figure 5:
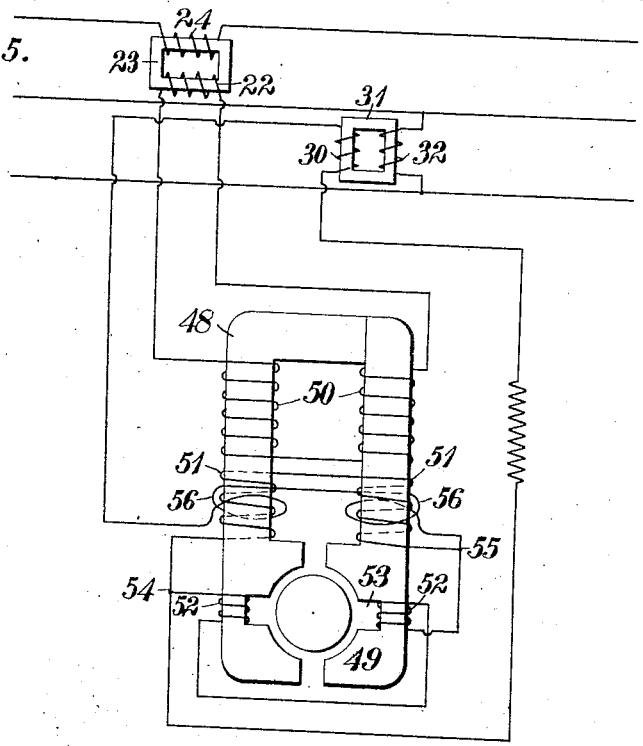
Figure 6:
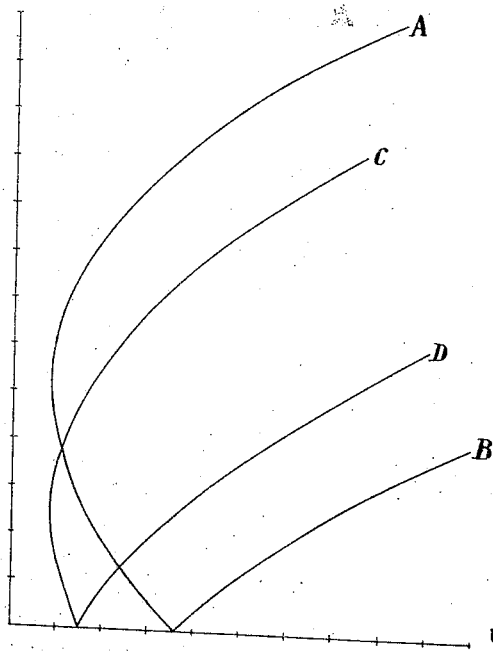

Figure 1 of the accompanying drawings illustrates, diagrammatically, a three-phase system embodying my invention. Fig. 2 is a diagram of torque curves pertaining to my invention. Fig. 3 illustrates, diagrammatically, a modified form of my invention as applied to a two-phase system. Figs. 4 and 5 illustrate, diagrammatically, other modified forms of my invention, and Fig. 6 is another diagram of curves that pertain to my invention.

A supply circuit, comprising conductors 1, 2 and 3, is protected by means of a circuit-breaker 4 that is provided with a tripping coil 5, the circuit of which is opened and closed by means of a switch-arm 6 that is normally maintained in open-circuit position by means of a spring 7 and is adapted to be moved into engagement with a contact terminal 8 by means of a movable member of a protective relay device 11, here shown as a shaft 10.

The shaft 10 is provided with conducting disks 12 and 13 that are rotatable, respectively, between the polar faces of magnetizable cores 14 and 15, and 16 and 17. Portions of one or both of the pole extremities of each of the magnetizable cores 14 and 15 may be provided with closed circuit conductors 18, and portions of one or both of the polar extremities of each of the magnetizable cores 16 and 17 may be provided with windings 19 and 20. The magnetizable core 14 is provided with a winding 21 that is connected in series with the winding 19 and with the secondary winding 22 of a series transformer 23, the primary winding 24 of which is connected in circuit with supply conductor 1, and magnetizable core 15 is provided with a winding 25 that is connected in series with winding 20 and with the secondary winding 26 of a series transformer 27, the primary winding 28 of which is connected in circuit with supply conductor 3. The magnetizable core 16 is provided with a winding 29 that is supplied with energy from the secondary winding 30 of a transformer 31, the primary winding 32 of which is connected between supply conductors 1 and 2, and the magnetizable core 17 is provided with a winding 33 that is supplied with energy from the secondary winding 34 of a transformer 35, the primary winding 36 of which is connected between supply conductors 2 and 3.

The above-mentioned windings are so connected and arranged that the torque which is exerted upon the conducting disk 12 is opposed to that which is exerted upon the conducting disk 13, and unless the sum of the torques or the difference of the torques,—that is, unless the algebraic sum of the torques exceeds a predetermined amount, the arm 6 is prevented by the spring 7 from engaging the contact terminal 8.

In the practical use of my invention, it may become desirable to provide means for retarding or damping the movements of the rotatable member in order to prevent operation of an instrument in a parallel circuit to one which may have become disabled and which is protected by another instrument, and also in order to prevent sudden overloads or other momentary disturbances in the circuit from causing the circuit-breakers to open. I have accordingly provided the shaft 10, which connects the rotatable conducting members with a damping device comprising radial vanes 37, it, of course, being understood that any other suitable form of damping device may be employed.

The operation of the system may be understood from a consideration of the curves of Fig. 2, in which the abscissæ are proportional to the amount of current traversing a circuit and the ordinates are proportional to the torques exerted upon the conducting disks. A curve A represents the variations in the torque due to variations in the amount of current, and it has approximately the form of a parabola, since the torque varies approximately in proportion to the square of the current. Curve W is that of the wattmeter device, and, for 100 per cent. power factor, it is approximately a straight line, since the torque of the wattmeter device is approximately proportional to the first power of the current. The two curves cross at a point $a$, under which conditions the two torques are exactly balanced. Now let it be assumed that to move the switch-arm 6 against the force exerted by the springs 7, a torque is required which is equal to that represented by the length of the ordinate 0—38. Then when the current traversing the circuit either equals or exceeds that represented by the length of the abscissæ 0—39, the torque exerted by the ammeter device will exceed that exerted by the wattmeter device by an amount either equal to or in excess of that represented by the length of the ordinate 0—38, and the switch-arm 6 will then be moved into engagement with the contact terminal 8, thereby completing the circuit of the operating magnet winding 5 and causing the circuit-breaker 4 to open. If a current equal to that represented by the length of the abscissa 0—40 traverses the circuit in a direction opposite to the normal direction, the torque exerted by the ammeter device will be represented by the length of ordinate 0—41 and the torque exerted by the wattmeter device will be represented by the length of the ordinate 0—42. These two torques will act in the same direction so that the total torque will be represented by the sum of the ordinates 0—41 and 0—42 and will be equal to the torque represented by the ordinate 0—38. If the sum of the torques is equal to or exceeds the length of ordinate 0—38, the switch-arm 6 will be moved into engagement with the contact terminal 8, the operating magnet winding 5 will be energized and the circuit-breaker 4 will be caused to open. It will be noted that the switch-arm 6 moves into engagement with the contact terminal 8 whether operated on account of an excessive current in the supply circuit or on account of a reversal of the direction of the drop of potential, because the direction of the torque of the wattmeter mechanism changes when the direction of the drop of potential in the circuit reverses.

In Fig. 3, I have shown my invention as applied to a two-phase circuit and have also shown another form of relay device, in which the wattmeter and ammeter movements for each pair of supply conductors are combined into one device. Each device comprises a U-shaped magnetizable core 43 having opposing, concave polar faces 44 between which a conducting cylinder 45 is rotatably mounted, the two cylinders being rigidly connected together by means of a shaft 10, or otherwise. Windings 19 and 20 surround centrally located portions 46 of the pole pieces that are of reduced cross-section and are formed by recesses in the pole faces, and closed circuit conductors 18 and 18ᵃ are located at the sides of the portions 46 and respectively surround portions 47 and 47ᵃ of the polar extremities. The principal windings 29ᵃ that are placed upon the yokes of the cores 43 are respectively connected in series with the secondary windings 30 and 34 of the transformers 31 and 36.

The form of instrument which I shall probably prefer to employ is a modification of the instrument forming the subject-matter of Patent No. 794,395, and shown in Fig. 4, to which I will now refer. A U-shaped magnetizable core 48 having pole pieces 49 is provided with a winding 50 that is located upon the yoke of the core and is supplied with current from the secondary winding 22 of transformer 23 that is proportional, in amount, to the current traversing the supply conductor 1. A winding 51, which is also located upon the yoke of the magnetizable core, is connected in a closed circuit with a winding 52 that surrounds reduced portions of the pole pieces 49, which are formed by recesses 53 cut in the pole faces. As described in the aforesaid patent, this instrument will operate as an ammeter, and a torque will be exerted thereby upon the movable member 45 that will be proportional to the square of the current traversing the conductor 1. Current is also supplied to the winding 52 that is proportional in amount to the difference of potential existing between the supply conductors 1 and 2, this current being derived from the secondary winding 30 of transformer 31. According to well known principles, the torque exerted upon the movable member 45 will then be proportional to the product of the amount of current traversing the winding 50, the voltage impressed upon the winding 52 and the cosine of the phase angle existing between the current and the electromotive force. The torque of the instrument, when operating as an ammeter, should normally oppose that of the instrument when operating as a wattmeter.

It is evident that the current derived from the secondary winding 30 of transformer 31 divides at the points 54 and 55, part of it traversing the winding 52 and part the winding 51, the part which traverses the winding 52 producing a flux which coöperates, as just described, with that produced by the current traversing the winding 50 to exert a torque upon the movable member 45 that is proportional to the amount of energy traversing the circuit. A torque is also exerted upon the movable member 45 which is produced by the fluxes due to the currents in the windings 51 and 52, respectively, that are derived from the secondary winding 30 of the transformer 31. This torque is proportional to the square of the amount of current traversing the secondary winding 30 of the transformer 31, and since this current is proportional to the voltage between the circuit conductors 1 and 2, the torque is also proportional to the square of the said voltage. However, as the current traversing the winding 52 that is derived from the transformer 31 is opposite in direction to that traversing the same winding that is derived from the winding 51 acting as a secondary to the winding 50, it does not supplement the main ammeter torque but is opposed to it. Then the amount of current which may traverse the circuit when the direction of the drop of potential is normal without causing the circuit-breakers to open is in excess of that which could traverse the circuit if such a torque were not exerted.

When the direction of the drop of potential becomes reversed, the three torques are added, because the two elements of current in the winding 52 then become of the same direction, and consequently less current may traverse the circuit under these conditions than if this third torque were not exerted. As it is ordinarily desirable that the amount of current which may traverse the circuit when the direction of the drop of potential is normal without causing the breakers to open should be large as compared with the normal current, and that the circuit-breakers should be opened by only a very small amount of current when the direction of the potential drop is reversed, it is seen that this form of instrument will generally be found most useful as a protective device. In certain cases, however, it may be found desirable to vary these conditions of operation, and to that end I have provided the yoke of the core of the instrument shown in Fig. 5 with an additional winding 56 that is connected in series circuit with the secondary winding 30 of the transformer 31. The object of this winding is to neutralize the flux produced by that current in the winding 51 which is derived from the secondary winding 30 of the transformer 31.

For the purpose of illustrating the effect of the winding 56 upon the operation of the instrument, I have shown curves in Fig. 6, the ordinates of which are proportional to the amount of current traversing a circuit and the abscissæ of which are proportional to the resultant torque of the instrument; that is, to the algebraic sum of the torques exerted by the instrument when operating respectively as a wattmeter and as an ammeter. The curve A illustrates the variations in the resultant torque with the amount of current traversing a circuit when the direction of the drop of potential is normal and when an instrument of the form shown in Fig. 4 is employed. Curve B illustrates the variations in the resultant torque with the variations in the amount of current traversing a circuit when the direction of the drop of potential is reversed from its normal direction and when an instrument of the form shown in Fig. 4 is employed. Curve C illustrates the variations in the resultant torque with variations in the amount of current traversing a circuit when the direction of the drop of potential is normal and when an instrument of the form shown in Fig. 5 is employed, and curve D illustrates the variations in the resultant torque with variations in the amount of current traversing a circuit when the direction of the drop of potential is reversed from its normal direction when an instrument of the form shown in Fig. 5 is employed.

A comparison of curve A with curve C demonstrates that if a neutralizing winding 56 is not employed, the amount of current which may traverse a circuit when the direction of the drop of potential is normal without causing the relay device to trip the circuit-breakers is considerably greater in amount than the current at which the circuit-breakers would be opened if the neutralizing winding 56 were employed.

A comparison of curves B and D demonstrates the fact that the amount of current which may traverse a circuit, when the direction of drop of potential is reversed from its normal direction, without causing the circuit-breakers to open is less when the compensating winding 56 is omitted than when it is employed. The reason for this is that the torque which it is sought to eliminate by means of the compensating winding 56 opposes the main torque produced by the instrument operating as an ammeter when the direction of the drop of potential is normal, while the three elements of torque produced by the instrument are added when the direction of the drop of potential is reversed from its normal direction. If the winding 56 is employed, this torque may be eliminated, but the current which may traverse the circuit when the direction of the drop of potential is normal will be less, and the current which may traverse the circuit when the direction of the drop of potential is reversed from its normal direction will be greater, than if no compensating winding were employed.

While the forms of devices here shown are satisfactorily operative and may be found preferable to other constructions that may be devised, it is to be understood that I do not limit myself to these specific forms.

I claim as my invention:

1. The combination with a supply circuit, of a circuit-interrupting device, and a governing means for said device that is actuated by forces respectively proportional to the amount of energy and to the square of the amount of current traversing said circuit.

2. The combination with a supply circuit, of a circuit-interrupting device, and a governing means for said device that is actuated by forces respectively proportional to the product of the current, voltage and power factor of said circuit and to the square of the amount of current traversing the same.

3. The combination with a supply circuit, of a circuit interrupting device and a governing means for said device that is actuated by two forces, the one being dependent in value upon the amount of energy traversing the said circuit and the other being dependent in value only upon the amount of current traversing the circuit.

4. A device comprising a movable member, and means for applying thereto actuating forces that are respectively dependent in value upon the amounts of energy, current and voltage pertaining to a circuit.

5. A device comprising a movable member, and means for applying thereto actuating forces that are respectively proportional to the product of the current, voltage and power factor of a circuit; to the square of the amount of current traversing the circuit and to the square of the voltage of the said circuit.

6. A device comprising a movable member, and means for applying thereto actuating forces that are respectively proportional to the amount of energy and to the square of the amount of current traversing a circuit and to the square of the voltage of the said circuit.

7. A device comprising a movable member, and means for applying thereto opposing actuating forces that are respectively dependent in value upon the amounts of energy and current traversing a circuit.

8. A device comprising a movable member, and means for applying thereto actuating forces that are respectively proportional to the product of the current, voltage and power factor of a circuit and to the square of the amount of current traversing the said circuit.

9. A device comprising a movable member, and means for applying thereto actuating forces that are respectively proportional to the amount of energy and to the square of the amount of current traversing a circuit.

10. A device comprising a movable member and means for applying actuating forces thereto, one of which is dependent in value upon the amount of energy traversing a circuit and the other of which is dependent in value only upon the amount of current traversing the circuit.

11. A device comprising a movable member, and means for applying thereto actuating forces that are respectively proportional to the product of the current, voltage and power factor of a circuit and to the square of the amount of current traversing the said circuit, the said member being moved to a predetermined position when the algebraic sum of the said forces exceeds a predetermined value.

12. A device comprising a movable member, and means for applying thereto actuating forces that are respectively proportional to the amount of energy and to the square of the amount of current traversing a circuit, the said member being moved to a predetermined position when the algebraic sum of the said forces exceeds a predetermined value.

13. A device comprising a movable member and means for applying thereto actuating forces one of which is dependent in value upon the amount of energy traversing a circuit and the other of which is dependent in value only upon the amount of current traversing the circuit, the said member being moved to a predetermined position when the algebraic sum of the said forces exceeds a predetermined value.

14. A combination wattmeter and ammeter device having a movable member that is actuated by the algebraic sum of the wattmeter and ammeter torques.

15. A combination wattmeter and ammeter device having a movable member that is actuated by the algebraic sum of the torques exerted by said device.

16. The combination with a supply circuit, of a circuit controlling device and means for actuating the same when the algebraic sum of forces exerted thereby exceeds a predetermined value, one of the said forces being dependent in value upon the amount of energy which traverses the circuit and the other of which is dependent in value only upon the amount of current traversing the circuit.

17. The combination with a supply circuit, of a circuit-controlling device, and means for actuating the same when the algebraic sum of forces that are respectively proportional to the amount of energy and the square of the amount of current traversing the circuit exceeds a predetermined value.

18. The combination with a supply circuit, of a circuit-controlling device, and means for actuating the same when the algebraic sum of forces that are respectively proportional to the product of the current, voltage and power factor of the circuit and to the square of the amount of current traversing the circuit exceeds a predetermined value.

In testimony whereof, I have hereunto subscribed my name this 6th day of May, 1905.

FRANK CONRAD.

Witnesses:
C. AALBORG,
BIRNEY HINES.